(12) United States Patent
Wu et al.

(10) Patent No.: US 12,164,543 B2
(45) Date of Patent: Dec. 10, 2024

(54) EFFICIENT SPACE USAGE CACHE ON A DATABASE CLUSTER

(71) Applicant: Oracle International Corporation, Redwood Shores, CA (US)

(72) Inventors: Fan Wu, Menlo Park, CA (US); Teck Hua Lee, San Mateo, CA (US); Jesus Elohim Martinez Castillo, Zapopan (MX); Sujatha Muthulingam, San Ramon, CA (US)

(73) Assignee: Oracle International Corporation, Redwood Shores, CA (US)

( * ) Notice: Subject to any disclaimer, the term of this patent is extended or adjusted under 35 U.S.C. 154(b) by 26 days.

(21) Appl. No.: 17/966,379

(22) Filed: Oct. 14, 2022

(65) Prior Publication Data

US 2024/0126784 A1 Apr. 18, 2024

(51) Int. Cl.
*G06F 16/2455* (2019.01)
*G06F 16/23* (2019.01)
*G06F 16/27* (2019.01)

(52) U.S. Cl.
CPC ........ *G06F 16/275* (2019.01); *G06F 16/2365* (2019.01); *G06F 16/24552* (2019.01)

(58) Field of Classification Search
None
See application file for complete search history.

(56) References Cited

U.S. PATENT DOCUMENTS

| | | | |
|---|---|---|---|
| 8,661,068 B1* | 2/2014 | Seibel | G06F 16/172 707/825 |
| 9,135,123 B1* | 9/2015 | Armangau | G06F 16/172 |
| 2008/0235298 A1* | 9/2008 | Lin | G06F 16/2343 |
| 2015/0254294 A1* | 9/2015 | Marais | G06F 16/275 707/690 |
| 2017/0010968 A1* | 1/2017 | Li | G06F 12/0813 |
| 2023/0214322 A1* | 7/2023 | Meng | G06N 3/06 711/200 |

OTHER PUBLICATIONS

Hoogland, F., "Oracle database filesystem (DBFS) done the easy way!," Frits Hoogland Weblog, dated Jul. 17, 2010, URL: https://fritshoogland.wordpress.com/2010/07/17/oracle-database-filesystem-dbfs-done-the-easy-way/.

"Database File System (DBFS) Best Practices," DBFS Technical Brief, Oracle, URL: https://www.oracle.com/technetwork/database/performance/dbfsbestprctices0118-4214995.pdf, copyright 2019.

"Oracle Segment Shrink Space feature for Reclaiming unused space," S-Square, URL: https://www.s-squaresystems.com/blogs/oracle-segment-shrink-space-feature-for-reclaiming-unused-space/, dated Apr. 9, 2019.

(Continued)

*Primary Examiner* — Hau H Hoang
(74) *Attorney, Agent, or Firm* — Vista IP Law Group, LLP

(57) ABSTRACT

Described are improved systems, computer program products, and methods for obtaining space usage information within a clustered database system. Some approaches provide an improved algorithm and structure that gives the ability to compute the latest and accurate space usage with only in-memory operations.

21 Claims, 21 Drawing Sheets

(56) References Cited

OTHER PUBLICATIONS

Amitzi, L., "Shrink Table and Fragmentation in Oracle, Part 1," GoToDBA, URL: https://gotodba.com/2021/06/24/fragmentation-in-oracle-part-1/, dated Jun. 24, 2021.

"HP-UX: Estimating database space requirements based on the number of files," IBM, URL: https://www.ibm.com/docs/en/tsm/7.1.5?topic=requirements-hp-ux-maximum-number-files, dated Mar. 9, 2021.

"Cache Database Size Estimate," denodo community, URL: https://community.denodo.com/kb/en/view/document/Cache%20database%20size%20estimate, dated Nov. 18, 2021.

"Determining cache utilization and cache size," IBM, URL: https://www.ibm.com/docs/en/db2/9.7?topic=panel-determining-cache-utilization-cache-size, dated Mar. 1, 2021.

Kozak, A., "Estimating Disk Space Requirements for Databases," redgate, URL: https://www.red-gate.com/simple-talk/databases/sql-server/database-administration-sql-server/estimating-disk-space-requirements-for-databases/, dated Jan. 16, 2009.

* cited by examiner

```
402 → total_alloc = sum(local_alloc(inst) for inst in cluster)
404 → if total_alloc > global_alloc_seen:
408 →     used_space += (total_alloc - global_alloc_seen)
410 →     global_alloc_seen = total_alloc
412 → elif total_alloc < global_alloc_seen:
          // cluster reconfiguration detected. volatile struct must be primed
          again.
      else:
414 →     // no update needed
          // the same calculation is repeated for dealloc.
```

FIG. 4

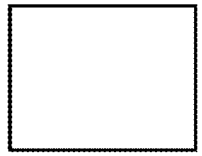
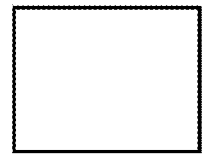
Instance I2
Local Alloc = 5
Instance I1
Local Alloc = 10
Global Alloc = 10
Time = T1
FIG. 5A

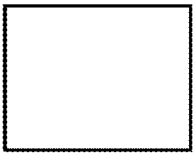
Instance I2
Local Alloc = 5
Instance I1
Local Alloc = 10
Used Space = 15
Global Alloc = 15
Time = T1
FIG. 5D

```
// assume disk_space_usage is the most accurate space usage the instance can possibly obtain
702 ──▶   disk_space_usage = compute_space_usage_from_disk_structures()
          // run sync to obtain the most recent used_space computed from caches in all instances
704 ──▶   sync_space_cluster // adjust local_alloc or local_dealloc
          if disk_space_usage > used_space:
              local_dealloc += (disk_space_usage - used_space)
706 ──▶   elif disk_space_usage < used_space:
              local_alloc -= (used_space - disk_space_usage)
          else:
              // used_space is accurate
              pass // at this point, any instance can run sync_space_cluster, and they will get the correct
          used_space
```

FIG. 7

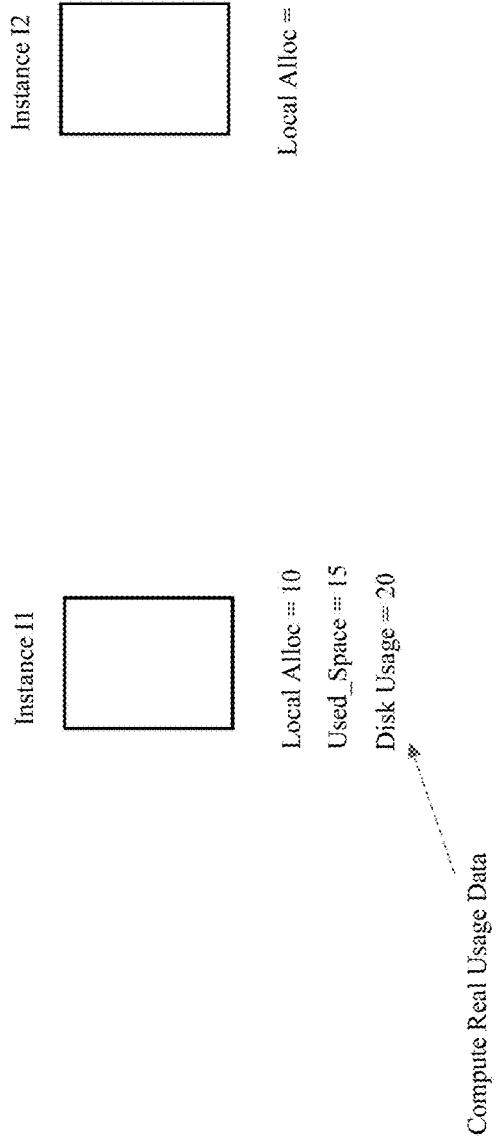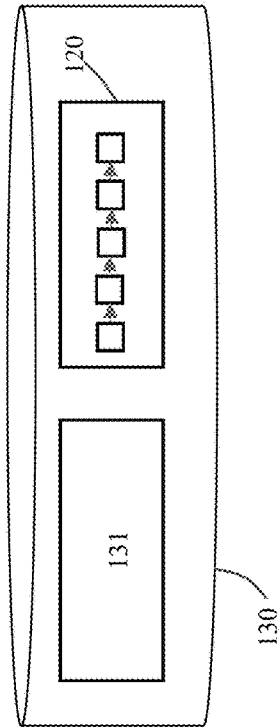
FIG. 8C

EFFICIENT SPACE USAGE CACHE ON A DATABASE CLUSTER

BACKGROUND

Data processing systems, such as database management systems (DBMSs) and relational database management systems (RDBMSs), allow applications running on clients (e.g., workstations, personal computers, or remote computing terminals) to access data stored in databases located at one or more database servers. Database servers may be interconnected by a network. This network may also connect one or more clients to the database servers, allowing the clients to submit queries and requests to perform operations on the data stored at the database servers via the network.

A database "cluster" is a type of system that allows the underlying servers within the computing infrastructure to communicate with each other so that they appear to function as a collective unit. Although the servers may be configured as standalone servers, each server has additional processes that communicate with other servers and where the different servers may access a shared/common set of database storage objects. The clustered database system therefore contains a shared architecture in which multiple running instances can each be used to manage a set of shared physical data files. In a "shared-everything" cluster, all nodes can access a shared resource for the database.

In clustered systems, it can be difficult to understand the true state of the shared resources, such as the current space usage of the shared storage devices accessible by the nodes within the cluster. This is because each of the nodes is capable of independently allocating and deallocating space within the shared storage device, and thus the exact usage state may be changing on a dynamic basis as the nodes are performing their work within the system. However, for capacity planning and system performance reasons, it is important to be able to efficiently obtain a relatively accurate view of the space usage state for the shared storage devices.

Conventional approaches to obtain accurate space usage information can be very inefficient. For example, one possible approach to handle this situation is to require each node to gather information directly from the disk/storage device each time it needs the space usage information. The problem with this approach is that it can be very expensive to require the node to access a storage device, and to gather and process the storage device data, each time it needs the space usage information. Another approach is to require the nodes to synchronize with each other every time an operation is performed that may affect space usage, so that each node can stay up-to-date on the space usage of the storage device. The problem with this approach is that this requirement to synchronize with other nodes may introduce significant latencies and bottlenecks within the system.

Therefore, there is a need for an improved approach to obtain space usage information within a clustered database system.

SUMMARY

Some embodiments of the invention provide an improved approach to obtain space usage information within a clustered database system. Embodiments of the present invention provides an improved algorithm and structure that provide the ability to compute the latest and accurate space usage with only in-memory operations.

Further details of aspects, objects and advantages of the disclosure are described below in the detailed description, drawings and claims. Both the foregoing general description and the following detailed description are exemplary and explanatory, and are not intended to be limiting as to the scope of the disclosure.

BRIEF DESCRIPTION OF FIGURES

The drawings illustrate the design and utility of some embodiments of the present disclosure. It should be noted that the figures are not drawn to scale and that elements of similar structures or functions are represented by like reference numerals throughout the figures. In order to better appreciate how to obtain the above-recited and other advantages and objects of various embodiments of the disclosure, a more detailed description of the present disclosure briefly described above will be rendered by reference to specific embodiments thereof, which are illustrated in the accompanying drawings. Understanding that these drawings depict only typical embodiments of the disclosure and are not therefore to be considered limiting of its scope.

The drawings use like reference numerals to identify like elements. A letter after a reference numeral, such as "120a," indicates that the text refers specifically to the element having that particular reference numeral. A reference numeral in the text without a following letter, such as "120," refers to any or all of the elements in the drawings bearing that reference numeral (e.g., "120" in the text refers to reference numerals "120a" and/or "120b" in the drawings). The disclosure will be described and explained with additional specificity and detail through the use of the accompanying drawings in which:

FIG. 4 shows detailed pseudocode for an approach to implement an operation to perform synchronization of space cluster information between the nodes.

FIGS. 5A-D provides an illustrative example of this approach being used to implement synchronization of the space usage values.

FIG. 7 shows pseudocode for an approach to implement the drift detection/correction according to some embodiments of the invention.

FIGS. 8A-F provide an illustrative example of this approach to detect and address drifts.

DETAILED DESCRIPTION

Various embodiments will now be described in detail, which are provided as illustrative examples of the disclosure so as to enable those skilled in the art to practice the disclosure. Notably, the figures and the examples below are not meant to limit the scope of the present disclosure. Where certain elements of the present disclosure may be partially or fully implemented using known components (or methods or processes), only those portions of such known components (or methods or processes) that are necessary for an understanding of the present disclosure will be described, and the detailed descriptions of other portions of such known components (or methods or processes) will be omitted so as not to obscure the disclosure. Further, various embodiments encompass present and future known equivalents to the components referred to herein by way of illustration.

Some of the terms used in this description are defined below for easy reference. The presented terms and their respective definitions are not rigidly restricted to these definitions—a term may be further defined by the term's use within this disclosure. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Some embodiments of the invention provide an improved approach to obtain space usage information within a clustered database system. Embodiments of the present invention provides an improved algorithm and structure that provides the ability to compute the latest and accurate space usage with only in-memory operations.

Figure 1:
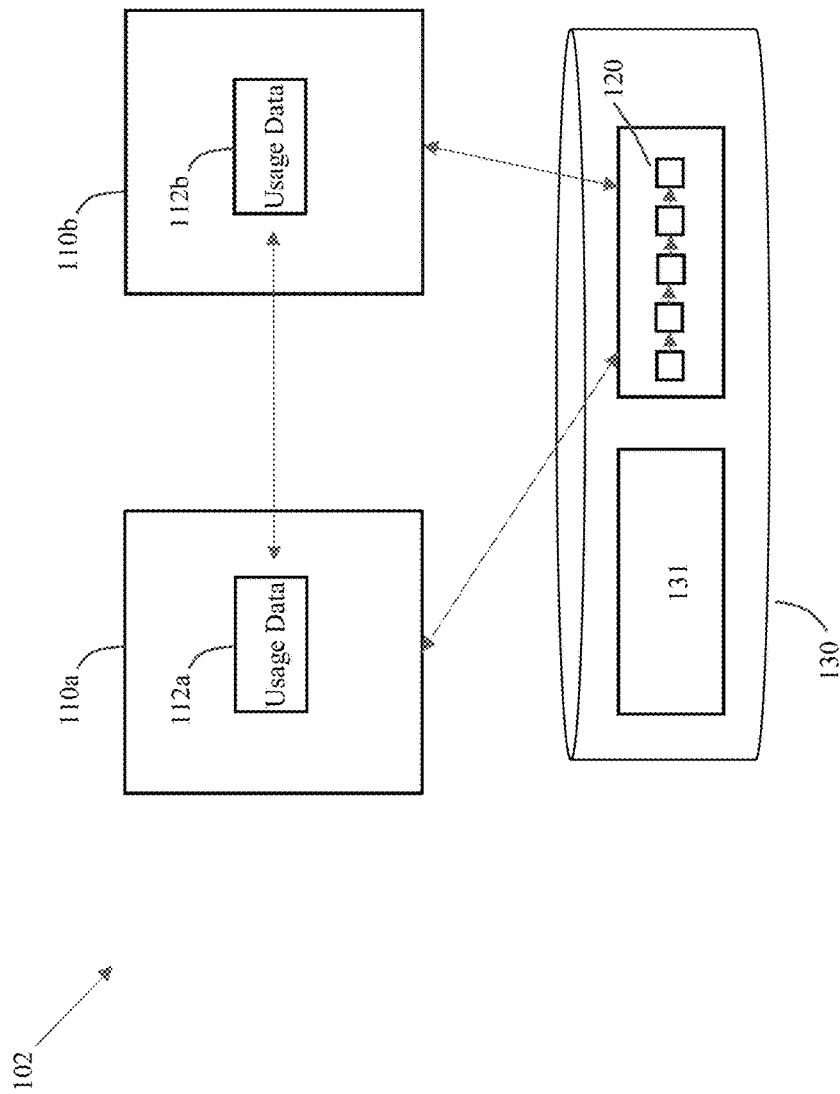
FIG. 1 illustrates a clustered database environment.

For background explanation purposes, FIG. 1 is provided to illustrate a clustered database environment 102. The clustered database environment 102 includes a shared database and allows a single database to be run across multiple instances/nodes (e.g., servers) in order to improve or maximize availability and to enable horizontal scalability, while accessing shared storage (e.g., the shared storage device 130). For example, the clustered database environment may include a plurality of instances 110a and 110b, where each instance of the plurality of instances may correspond to one or more entities that perform database-related operations in the system. An entity may include a session as well as any other suitable processing entities. Each of the database instances may reside on a separate host and forms its own set of background processes and memory buffers, but in which the cluster infrastructure allows access to a single shared database via multiple database instances. In this way, the separate servers (e.g., nodes) appear as if they are one system to applications and end users.

The database system may include one or more users or database applications within the system that operate from or using a user station to issue commands to be processed by database management system (DBMS) upon one or more database tables. The user stations and/or the servers that host or operate with the database system comprises any type of computing device that may be used to implement, operate, or interface with the database. Examples of such devices include, for example, workstations, personal computers, mobile devices, servers, hosts, nodes, or remote computing terminals. The user station comprises a display device, such as a display monitor, for displaying a user interface to users at the user station. The user station also comprises one or more input devices for the user to provide operational control over the activities of the system, such as a mouse or keyboard to manipulate a pointing object in a graphical user interface to generate user inputs. The database system may be communicatively coupled to the storage device 130 (e.g., a storage subsystem or appliance) over a network. The storage device 130 comprises any storage mechanism that may be employed by the database system to hold storage content, such as but not limited to a hard disk drive, SSD, persistent memory, storage array, network attached storage, etc.

The storage device may include any number of data objects 131 that are stored within the system, and which consume storage space on the storage device 130. Metadata 120 may also exist on the storage device 130 that contain information that describes the usage of portions (e.g., blocks) for the data object.

In the DBMS, a frequent operation that is often performed is to obtain accurate space usage information for an on-disk storage abstraction for data objects 131 stored in the storage device 130. These data objects may also be referred to here as a "segment" to describe such an abstraction.

In a shared-everything database cluster as shown in FIG. 1, all nodes/instances in the cluster may modify the data segments stored on the shared storage system. The modification by one instance may change the space usage of the segment accessible by all the other instances. Retrieval of the most recent space usage information from disk can be a very expensive operation due to the need to potentially access a large amount of information for very large segments (e.g., LOB segments). What typically happens for a single segment is that the node that requests the information starts by landing on a header and gets a first metadata block for a given segment, then proceeds to traverse an entire chain of linked-list elements for the metadata 120 that may be scattered across the entire disk, followed by the performance of additional calculations on that metadata to determine the space usage. This is a time-consuming and expensive process even for a single segment. When a large number of segments (e.g., >1000) needs to be examined across the disk, then the disk access requirements may become a very significant performance bottleneck.

Another possible approach is to maintain up-to-date usage data in a memory cache 112a and 112b at each respective node 110a and 110b. With this approach, each change to the space usage by one node would synchronously cause a change to the space usage data maintained by all other nodes in the cluster. However, this approach can also create severe performance bottlenecks in the system. This is because of possible contentions that for the buffer caches that may occur when these activities must be done synchronously, which would likely involve significant costs due to locking and the need to identify who has the most recent copy/update for the space usage information.

Therefore, the non-optimal approaches to maintain space usage information all suffer from various performance problems, for example, because of the need to: (1) walk on-disk free lists; (2) perform acquisition of shared/exclusive access to the blocks; (3) perform synchronization of buffer image across instances; and/or 4) suffer from pollution of the buffer cache with blocks that are only read once.

Given the need to obtain the accurate space usage for numerous segments, and the challenges imposed by accessing the disk, embodiments of the present invention provides an improved algorithm and structure that provides the ability to compute the latest and accurate space usage with only in-memory operations.

Figure 2:
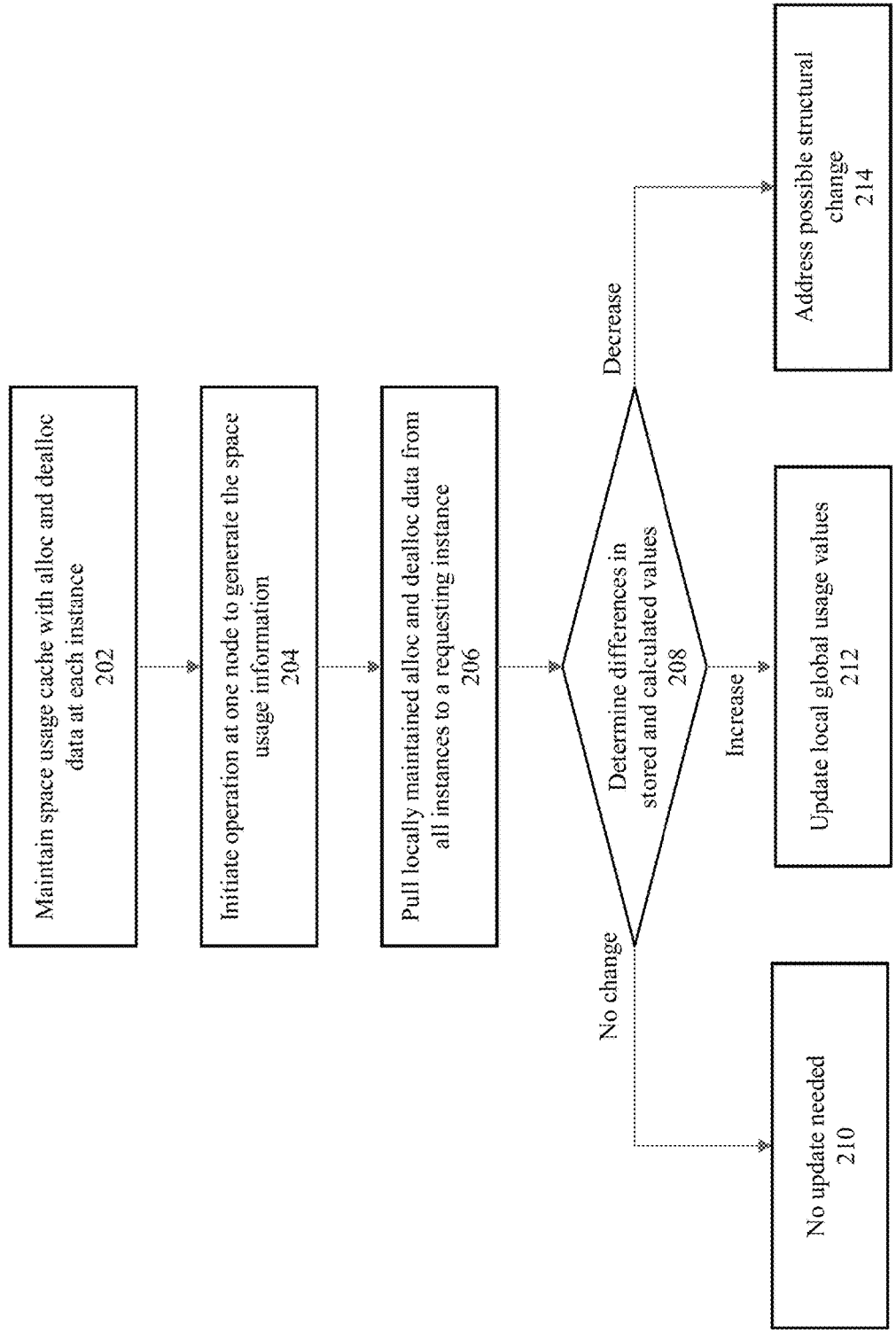
FIGS. 2 and 3 describe an efficient space usage cache and approach for using the space usage cache to effectively maintain space usage information in the database system.
Figure 3:
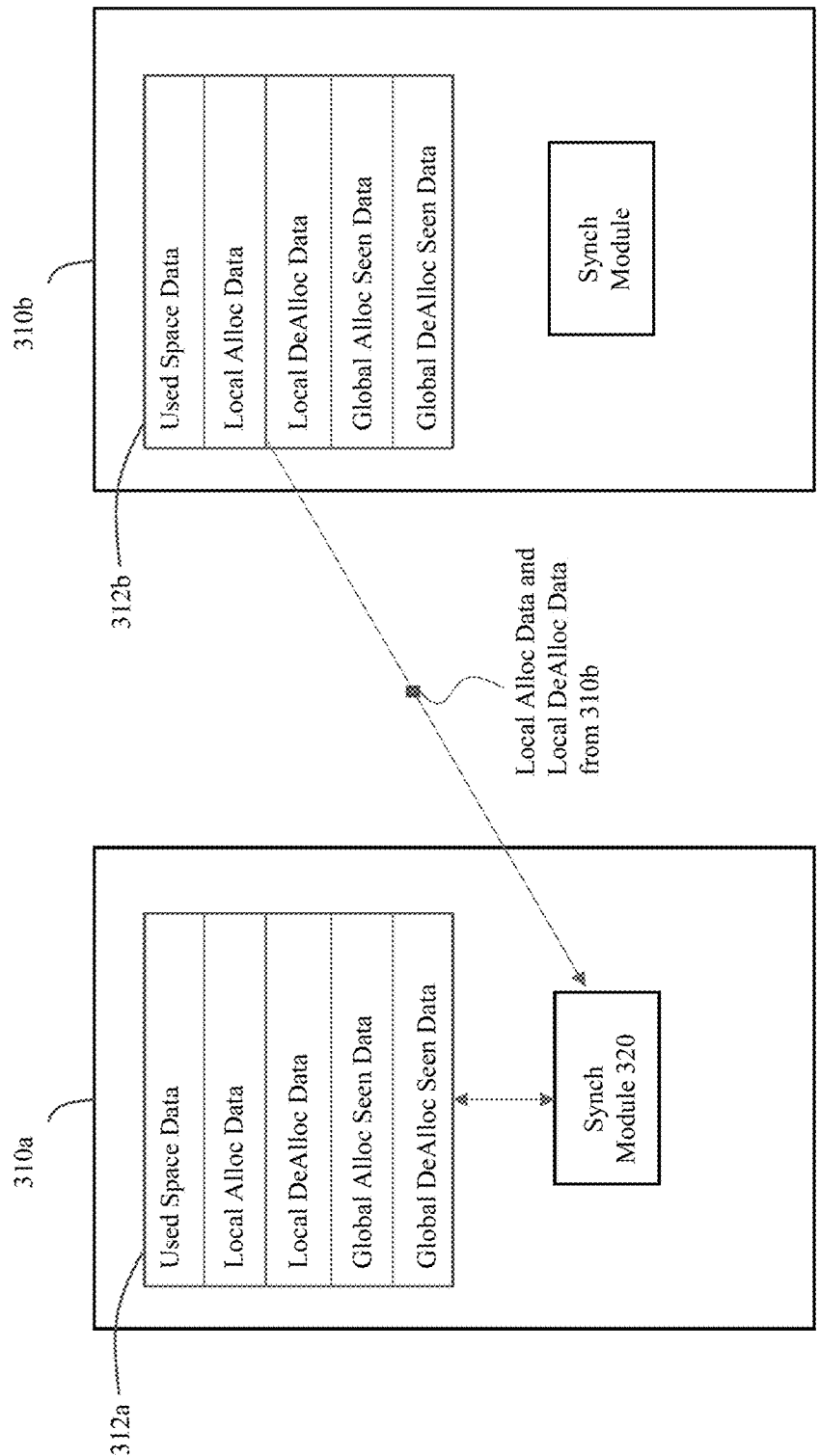

FIGS. 2 and 3 describe an efficient space usage cache and approach for using the space usage cache to effectively maintain space usage information in the database system. As shown in FIG. 3, the space usage cache 312a and 312b is implemented as a volatile data structure by every instance 310*a* and 310*b*, respectively, in a shared-everything cluster. The data structure is used to compute the most recent amount of space used for a data object residing on the shared disk.

A synch module 320 is employed within a node to implement operations for the space usage determinations. The synch module implements operations for space usage, such as for example: (1) synchronizing the local structures in all instances through cross-instance calls; and/or (2) returning a used_space value for the data object since last synchronization. The cost of a synchronization of the volatile structures using this approach is lower than the cost of reading the on-disk structures, which may involve disk locks and buffer invalidation.

FIG. 2 shows a flowchart for an approach to use the space usage cache to calculate and maintain space usage information in the database system. At 202, the space usage cache is maintained at each node, where the space usage cache includes various types of data for tracking allocations and deallocations of space by that node. In some embodiments, the volatile structure of the space usage cache includes some or more of the following fields: (1) used_space: amount of space used for an segment since last cluster wide synchronization; (2) local_alloc: amount of space allocated in the local instance; (3) local_dealloc: amount of space freed in the local instance; (4) global_alloc_seen: amount of space allocated in all instances (including the local instance) that has been factored into used_space; and/or (5) global_dealloc_seen: amount of space freed in all instances (including the local instance) that has been factored into used_space.

What is notable that is that each node will therefore independently and locally track its own localized use of space for data objects. This local tracking is done without the need for any coordination with other nodes. However, as described below, when there is a need to determine space usage, then one of the nodes on an as-needed basis can then pull this information from every other node to calculate the space usage values.

At step 204, an operation may be initiated at one of the nodes to generate space usage information. Situations where it may be desirable to obtain the space usage information may include, for example: (a) when the database administrator (DBA) specifically queries the usage of a segment; (b) when sampling of space usage for various segments are required for auditing (e.g., performance, security, etc.); and/or (c) when the sampling is required by autonomous database to regulate itself through various actions.

At 206, the requesting node will then pull locally maintained alloc and dealloc data from the other nodes in the cluster. What should be noted is that this step means that the current approach is using a "pull" model to generate the space usage data. This is distinct from, and advantageous, over a "push" model which requires synchronization whenever a space usage operation is performed. The push model imposes significant real-time latencies and costs to the system for every such operation, whereas the current pull approach only incurs those costs on an as-needed basis.

At 208, a determination is made whether, after analysis of the pulled alloc and dealloc values from the other nodes, if there is any change to the global space usage values that were previously stored in the space usage cache. If there is no change from the previous value, then at 210 it can be determined that no update is needed and that the previously saved space usage values can be provided in response to the space usage query. On the other hand, if there is an increase in the alloc or dealloc values based upon the data pulled from the other nodes, than this indicates at 212 that there is a need to generate an update to the usage data.

In the current embodiment, the local alloc and dealloc values are running totals that increment based upon localized operations at that node. Therefore, these values should only increase over time, and should never decrease. As such, if it is determined at 208 that a decrease has occurred, then it is likely that a structural change has occurred which is identified at 214. This situation may need to be addressed to resolve any incorrect values that are stored in the space usage cache, which is addressed in more detail below.

FIG. 4 shows detailed pseudocode for an approach to implement an operation to perform synchronization of space cluster information between the nodes (which may be referred to herein as "sync_space_cluster"). In general, the operation is initiated by one instance, and will cause all other instances to send their respective local_alloc and local_dealloc to the initiating instance through cross-instance calls. The initiating instance will then update its volatile structure using the pseudo-code shown in the figure.

The pseudocode at 402 calculates the total amount of space that had been allocated by all the instances in the cluster. This is performed by obtaining all of the locally maintained alloc values, and adding them up to generate a "total_alloc" value.

A determination is made at 404 whether the total alloc value that was calculated at 402 (total_alloc) is greater than the global alloc value (global_alloc_seen) that had previously been saved in the local space usage cache. If so, then at 408, the used space value (used_space) is incremented with the difference between the calculated total and the previously seen global value. In addition, at 410, the global seen value is updated to reflect the total alloc value.

However, if at 412 it is determined that the total alloc value that was calculated at 402 is less than the global alloc value previously seen, this this indicates that there may be a potential reconfiguration or problem that has been identified. This can be addressed in any number of ways. For example, one possible approach is to prime the space usage structure to reflect the potential reconfiguration, so that values can be reset to a correct value. Another approach is to simply leave everything alone, especially if the reconfiguration does not affect the correctness of the space usage values that are currently saved.

As shown at 414, it is possible that total alloc value that was calculated at 402 is the same as the global alloc value previously seen. If this occurs, then this means that the previously seen global alloc value is still correct, and that no updates are currently needed at this time.

Figure 5B:
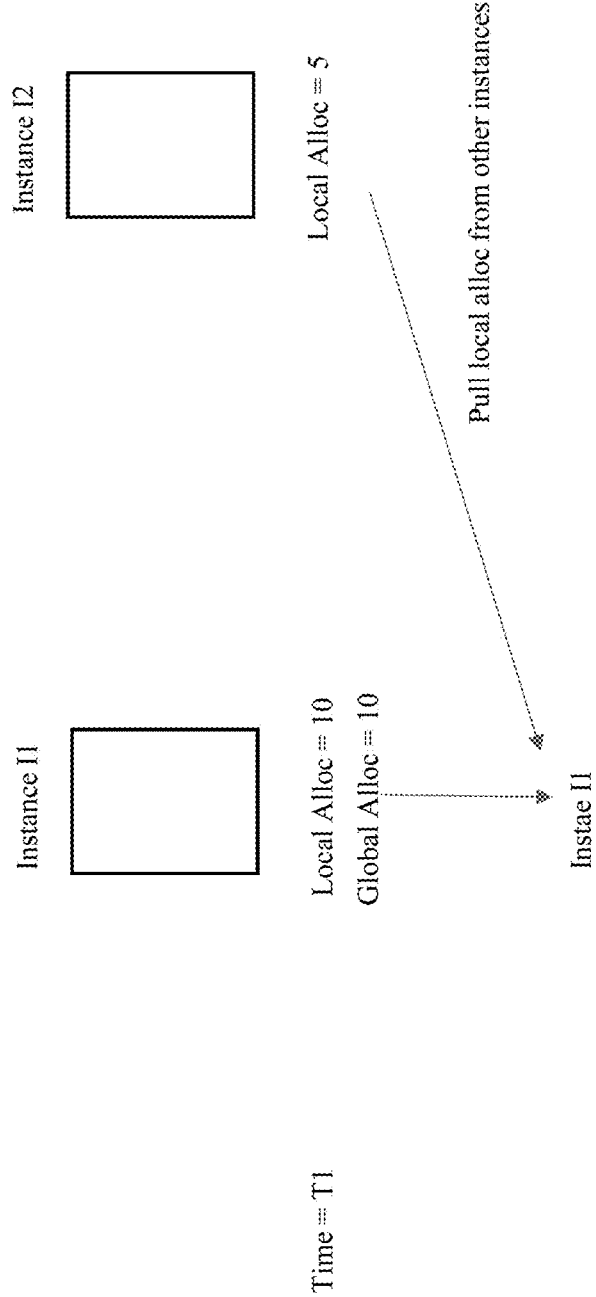

FIGS. 5A-D provides an illustrative example of this approach being used to implement synchronization of the space usage values. FIG. 5A shows two instances I1 and I2. At time T1, this figure shows that the local alloc value maintained at instance I1 is "10". This figure also shows that the global alloc seen value at instance I1 is "10". The local alloc value maintained at instance I2 is "5".

Assume that Instance I1 seeks to initiate an operation to perform synchronization of space cluster information between the nodes. As shown in FIG. 5B, the local alloc value is then pulled from instance I2 to instance I1.

Figure 5C:
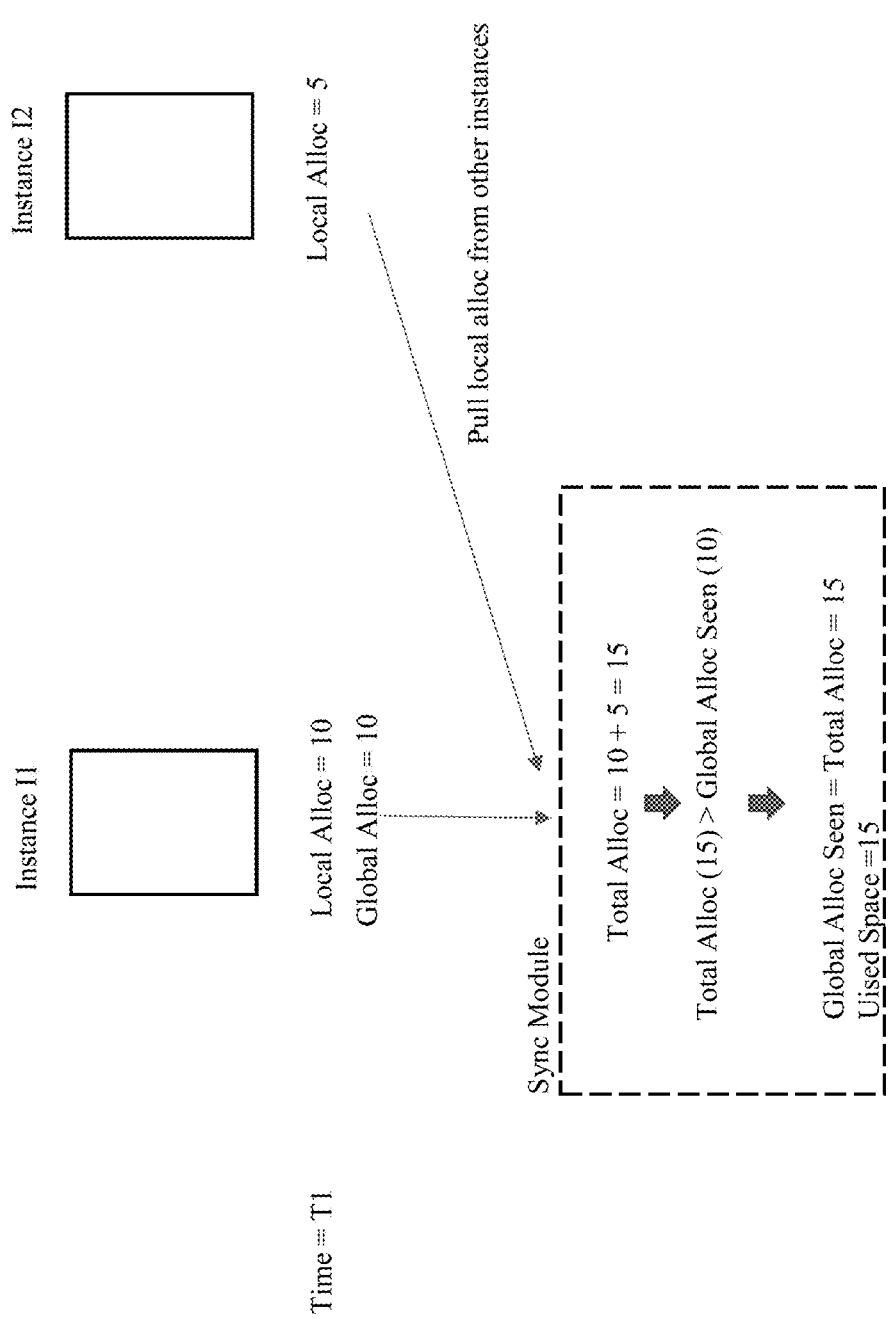

Next, as shown in FIG. 5C, the total alloc value is calculated by adding up all the local alloc values, resulting in a total alloc value of "15". A determination is made whether the total alloc value is greater than the global seen value. In the current example, the total alloc value (15) is indeed greater than the global alloc seen value (10). Therefore, pursuant to portion 410 from FIG. 4, this means that the global alloc seen value should be updated to reflect the total alloc value. The used space value is also updated to reflect the up-to-date calculation of the used space.

At the end of the sync operation, the initiating instance will now have the most recent space usage for the segment. When implemented correctly, all instances will reach the same used_space value after each of them invokes sync_space_cluster. The client of the cache may issue sync_space_cluster, followed by an operation to return the used_space value from the volatile struct for the local instance (referred to herein as get_space_usage_fast). It may further maintain the last time sync_space_cluster was executed, and if the time is recent enough, skip the call in some circumstances (e.g., if the information is not stale). The final result for the illustrative example is shown in FIG. 5D.

Figure 6A:
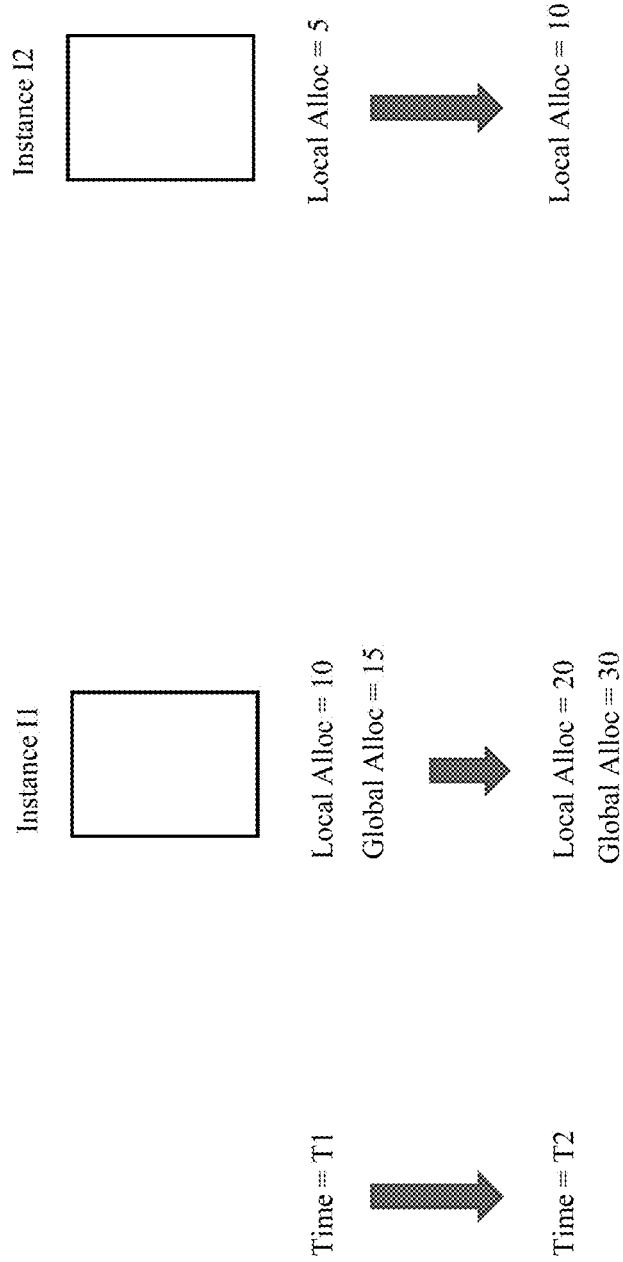
FIGS. 6A-D shows an example of using the synchronization operation to detect a possible reconfiguration.

FIGS. 6A-D shows an example of using the synchronization operation to detect a possible reconfiguration. FIG. 6A shows the instance I1 and I2 now at Time T2. At time T2, the local alloc value at instance I1 has now incremented to "20", reflecting the fact that between time T1 to T2 an additional allocation of space has occurred by Instance I1. The local alloc value at instance I2 has also incremented, from "5" at time T1 to a value of "20" at time T2, which similarly reflects the fact that between time T1 to T2 an additional allocation of space has occurred by Instance I2. The global alloc seen value is currently "30".

Figure 6B:
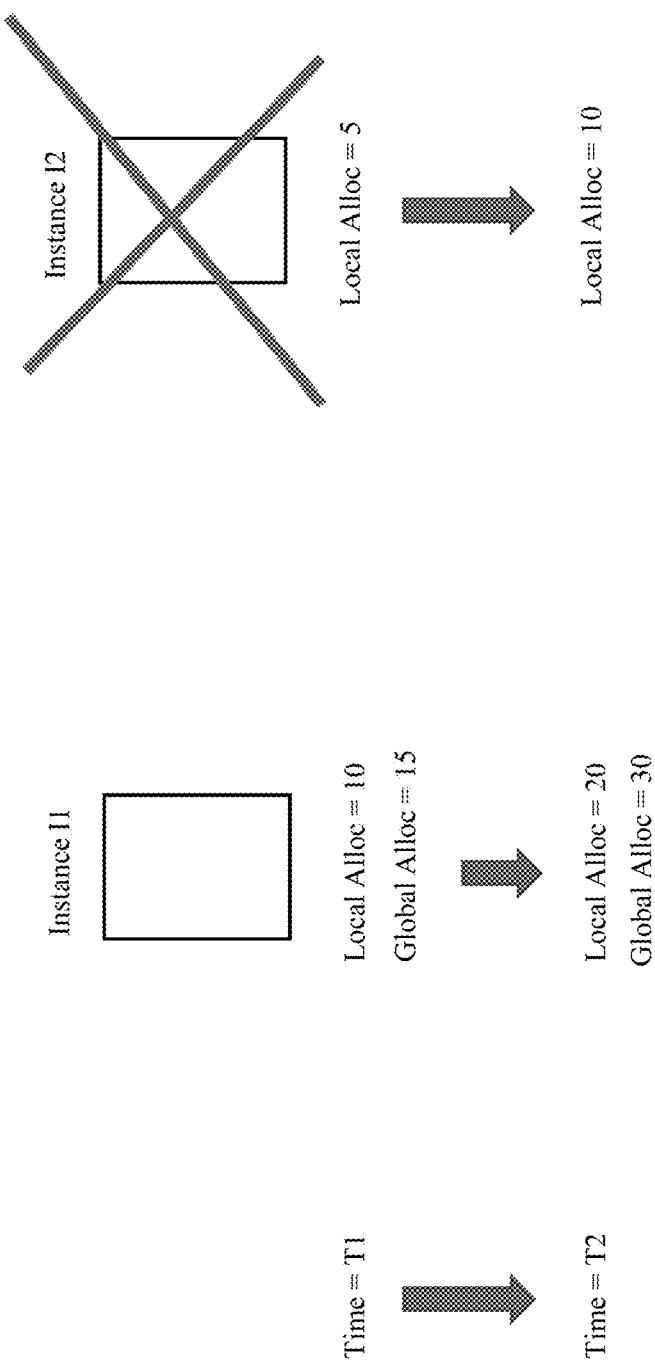
Figure 6C:
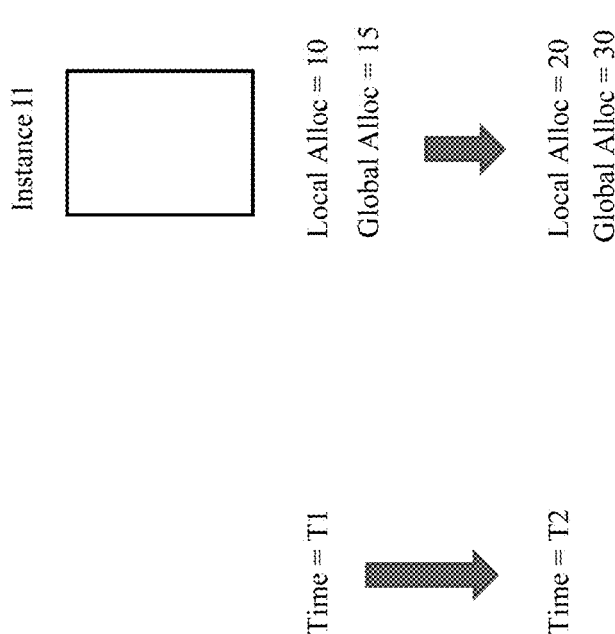

FIG. 6B illustrates the situation if a failure occurs to instance I2, e.g., a problem occurs such as a node failure or a network failure. What this means, as shown in FIG. 6C, is that instance I2 may not be reachable by the other instances, and hence any local alloc values maintained by I2 would not be pulled by instance I1 during a synchronization operation.

Figure 6D:
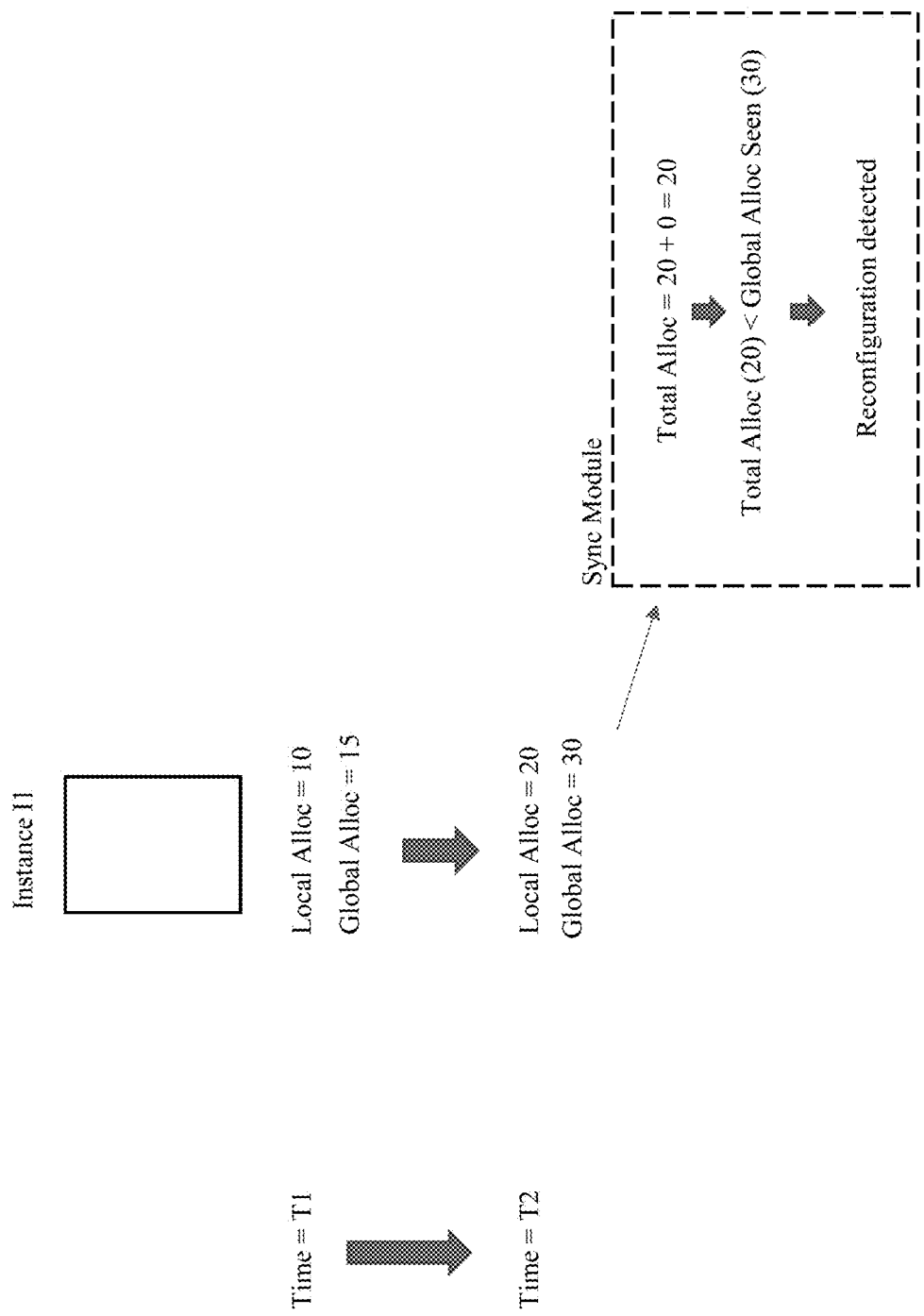

FIG. 6D shows what would happen if the instance I1 now performs the synch space operation at this point. The total alloc value is calculated by adding up all the local alloc values. In the current situation, the local alloc value from instance I2 cannot be obtained. This means that only the local alloc value from instance I1 can be used for this calculation, resulting in a total alloc value of "20".

A determination is made whether the total alloc value is less than the global seen value. In the current example, the total alloc value (20) is less than the global alloc seen value (30).

As previously stated, the local alloc and dealloc values are running totals that increment based upon localized operations at that node. Therefore, these values should only increase over time, and should never decrease. In the current situation, the total of the local alloc values did decrease, but only because the calculations could not reflect the local alloc values from the failed instance I2. However, since the calculation of the total alloc does in fact show that a decrease has occurred, then this is a clear indication that some sort of reconfiguration has occurred in the system.

At this point, any suitable approach can be taken to address the reconfiguration. One possible approach is to prime the space usage cache values. This would cause a reset of the saved space usage values to reflect the now-current state of the system. Alternatively, the system may choose to ignore the situation, since it is possible that despite the reconfiguration, the information in the space usage cache is still correct and/or usable for analysis purposes.

In some embodiments, priming may occur on each instance independently to obtain newly initialized values for the space usage cache. The steps include: (1) verifying there is no space usage cache primed for the disk object, which may involve querying a hash table that maps all space usage caches for different disk objects using a unique object identifier as key; (2) allocating the memory for the space usage cache struct; (3) initializing the fields of the struct. There are numerous approaches that can be taken to obtain the initial values for this third step. In a first approach, if at least one remote instance already has the space cache primed, then the local instance can retrieve the cache struct from the remote instance. The retrieved struct is referred to as "remote", and the local cache is initialized in the following way: (a) used_space=remote.used_space; (b) local_alloc=0; (c) local_dealloc=0; (d) global_alloc_seen=remote.global_alloc_seen; (e) global_dealloc_seen=remote.global_dealloc_seen. A second approach may be used if no instance currently has a primed cache, then the local cache is initialized in the following way: (a) used_space=compute_space_usage_from_disk_structureso; (b) local_alloc=0; (c) local_dealloc=0; (d) global_alloc_seen=0; (e) global_dealloc_seen=0. For the first approach, the remote cache needs to be recently synced. One possible way to achieve this is to request the cache from all instances and select the most up-to-date one. If none satisfies, then fallback to the second approach. Some aspects of the first and second approaches can be combined to form a more robust third approach. For example, in the first approach, instead of or in addition to getting used_space from a remote instance, the local instance may get used_space information from the disk and use the opportunity to detect and/or correct a drift. In some embodiments, concurrent priming across instances can be serialized through a cluster-wide lock.

While the above illustrative examples may provide explanations and/or examples specifically directed to one of alloc data or dealloc data, it is noted that equivalent techniques are applicable for the other type of data as well. Therefore, any illustrative examples described herein for alloc data are similarly applicable to dealloc data.

Some embodiments of the invention provide an approach in which a "drift" can be detected and corrected for by any instance. A drift occurs when the space usage values calculated and maintained using the space usage structure in memory ends up being different from the actual space usage numbers, e.g., from space usage data obtained through the storage objects on disk. With embodiments of the invention, detection of the drift does not require a wholesale change to the space usage values held in memory. Instead, a compensation amount can be applied to the local values maintained at the instance that detects the drift, where the instance detecting the drift can compensate for the drift in a local delta. The local delta with the compensation can then subsequently be propagated to the other instances when they perform a synchronization of the space usage values. This propagation of the change to the local delate helps correct the used_space value on all instances.

FIG. 7 shows pseudocode for an approach to implement the drift detection/correction according to some embodiments of the invention.

As shown at 702 of the pseudocode, the operation is initiated by one instance to walk the on-disk structures and compute the real space usage. This approach is premised upon the space usage values determined from the on-disk data providing greater accuracy for the space usage determination.

The most recent value for the used_space number is obtained. This may occur, for example, as shown at 704 to run a synch of the local alloc/dealloc information held by the distributed instances in the cluster (as described above for FIG. 4).

Next, as shown at 706, the approach will compare the result of the on-disk analysis to the used_space value in the cache. If a difference is found, adjustment will be made to local_alloc or local_dealloc such that any instance performing sync_space_cluster will obtain the correct used_space even though they have not walked the disk. In other words, the delta between disk_space_usage and used_space detected by one instance is compensated by the adjustment in local_alloc or local_dealloc, and such compensation helps other instances to reach the correct result. In particular, if the disk_space_usage calculate from the disk analysis is greater than the used_space value, then the local dealloc value is adjusted to compensate for the drift. On the other hand, if the disk_space_usage calculate from the disk analysis is less than the used_space value, then the local alloc value is adjusted to compensate for the drift. If they are exactly the same, then no drift is detected, and therefore no compensation is needed.

Figure 8A:

FIGS. 8A-F provide an illustrative example of this approach to detect and address drifts. FIG. 8A shows two instances I1 and I2. At time T1, this figure shows that the local alloc value maintained at instance I1 is "10". This figure also shows that the local alloc seen value at instance I2 is "5". The Used_Space value maintained at instance I1 is "15".

Figure 8B:
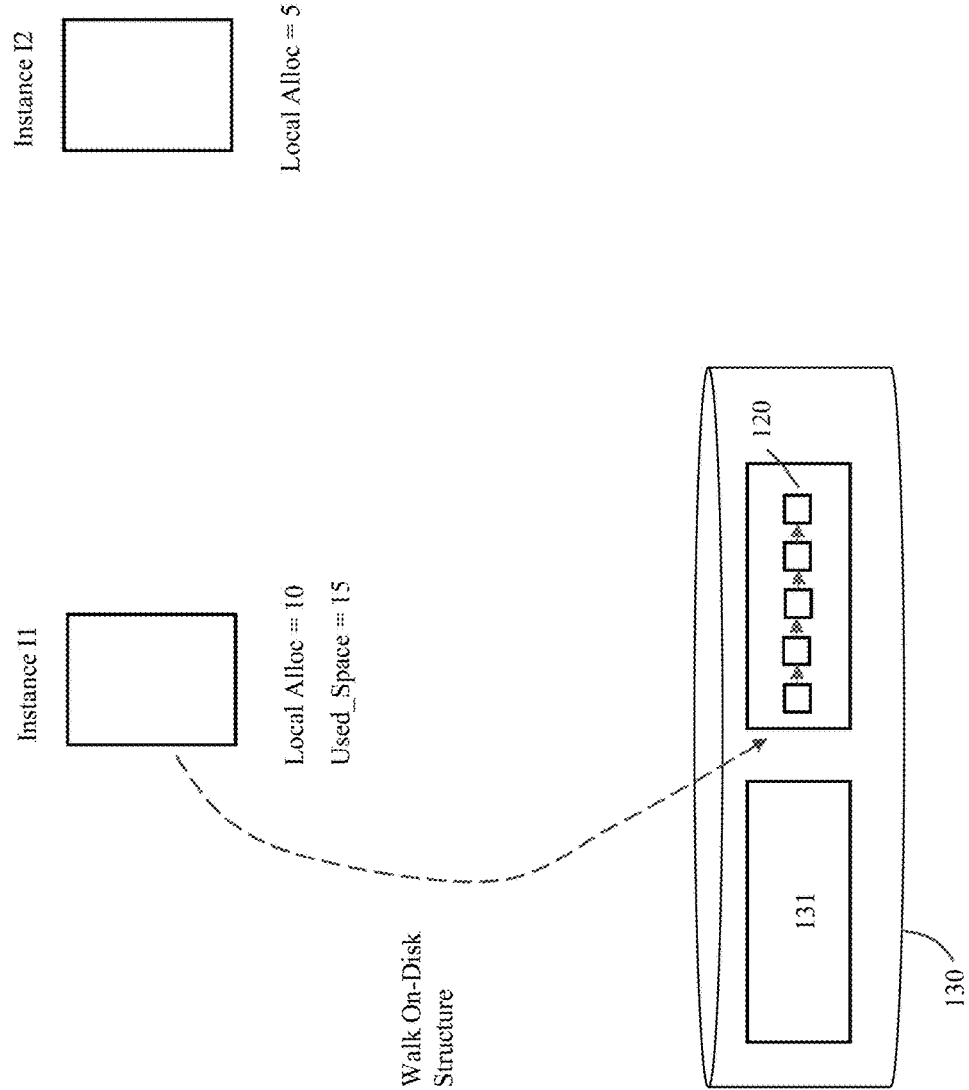

FIG. 8B illustrates that instance I1 has initiated an operation to walk the on-disk structures in storage device 130 to obtain a space usage determination for a segment, e.g., based upon a review of the metadata blocks in metadata 120. As shown in FIG. 8C, the disk space usage value obtained from the on-disk data analysis is "20".

It can be seen that the disk usage value (20) obtained from the on-disk analysis is greater than the Used_Space value (15) that is stored in the space usage cache. This means that some drift has occurred between the disk-based space usage data and the space usage data maintained in cache. As a result, some level of compensation should be applied at this point.

Figure 8D:
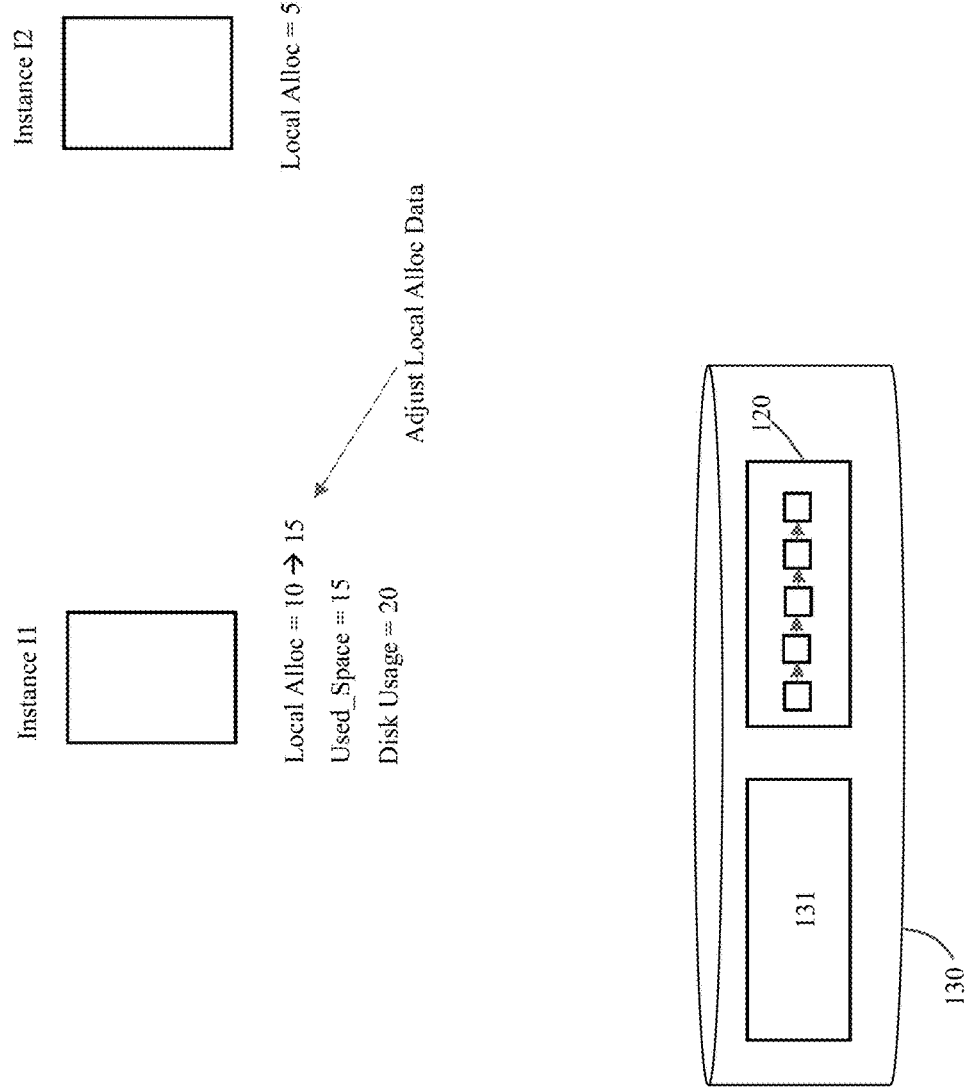
Figure 8E:
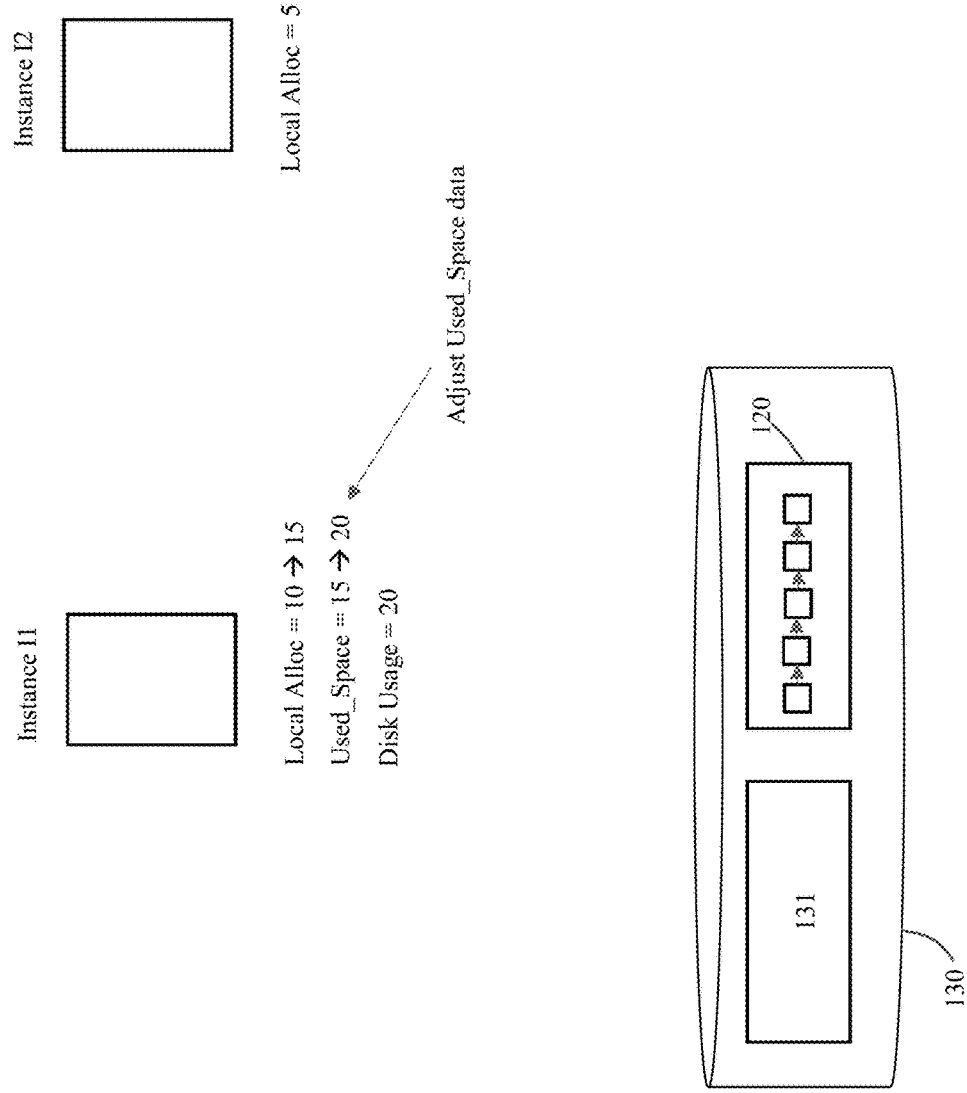
Figure 8F:

As shown in FIG. 8D, the local alloc value is adjusted in this situation by an increased value that matches the drift amount. In particular, the local alloc value is adjusted from a value of "10" to a new value of "15". The consequence of this is that the next time a sync operation is run by either this instance (I1) or any other instance in the cluster (I2), that new local alloc value will cause the Used_Space value at the various instances to increase to a new corrected value. As shown in FIG. 8E, because of the increase in the local alloc value, the Used_Space value is now adjusted upwards to an increased value of "20". This new Used_Space value now exactly matches the disk usage value that was obtained by performing the on-disk analysis. As shown in FIG. 8F, that updated Disk Usage value will also be updated to other instances due to the fact that the updated local alloc value from instance I1 will be sent to the other instances when the other instances perform a sync operation.

In practice, the approach to sync to disk (sync_space_disk) can be initiated by an instance for a variety of reasons. For example, the user may issue a command to get the space usage from the disk. The instance running the command can thus use the opportunity to update the space cache and benefit all instances.

It is noted that the pseudo-code described in FIG. 7 can be serialized across instances. This is usually done through a cluster-wide lock on the segment. Such locks (enqueue) are common in an RDBMS and the overhead is significantly lower than the overhead of walking disk structures.

One context in which the synchronization approach described above is particularly useful is in the context of a multi-tenant database. For example, the invention may be applied to a computing architecture that implements a multi-tenant database as a container database (CDB) system. A CDB consolidates multiple pluggable databases (PDB), and implements a portable collection of schemas, schema objects, and non-schema objects. With this architecture, a base infrastructure is provided by the CDB as a platform to implement and host individual private databases. The private databases themselves would then be "plugged" into the CDB as individual databases for a tenant embodied as the PDBs.

The space usage cache structure can be deployed in a CDB environment which contains many PDBs. This is very useful in this environment since each PDB can have many segments, e.g., LOB segments. Each LOB segment is self-descriptive, meaning that the space usage information is fully contained in the segment alone; there is no dictionary describing the usage within each segment. In addition, the CDB runs on shared-everything database clusters, where all nodes in a cluster may modify the data segments stored on the shared storage system.

Therefore, what has been described is an improved approach to maintain and determine space usage information in a database system. The approach can leverage cross-instance calls to obtain the space usage deltas from all instances, where the algorithm is implemented such that sync between instances (sync_space_cluster) is idempotent, and any instance can issue the operations as many times and the resulting used_space will remain stable. The most recent space usage data can be obtained very quickly with operations that are performed in memory—without requiring disk access. This is accomplished by performing a sync_space_cluster operation followed by an operation to retrieve the space_usage data from the cache (get_space_usage_fast).

Some embodiments provide an approach to detect cluster reconfiguration and invalidate the space cache instead of allowing used_space to drift from the truth. The approach is also able to self-correct from deviations from the on-disk space usage data. In the sync_space_disk operation, the disk space usage obtained by one instance is propagated to all instances through adjustments to local_alloc or local_dealloc followed by a sync_space_cluster.

The current embodiments provide numerous advantages. The space usage cache eliminates the need to walk on-disk structures in most cases. To obtain the space usage from disk, the time complexity is usually O(n) where n is the number of metadata blocks. In contrast, with the space usage cache, the cost is close to a small constant. In addition, the removal of the disk walk operation also saves the buffer cache from being polluted.

System Architecture Overview

Figure 9:
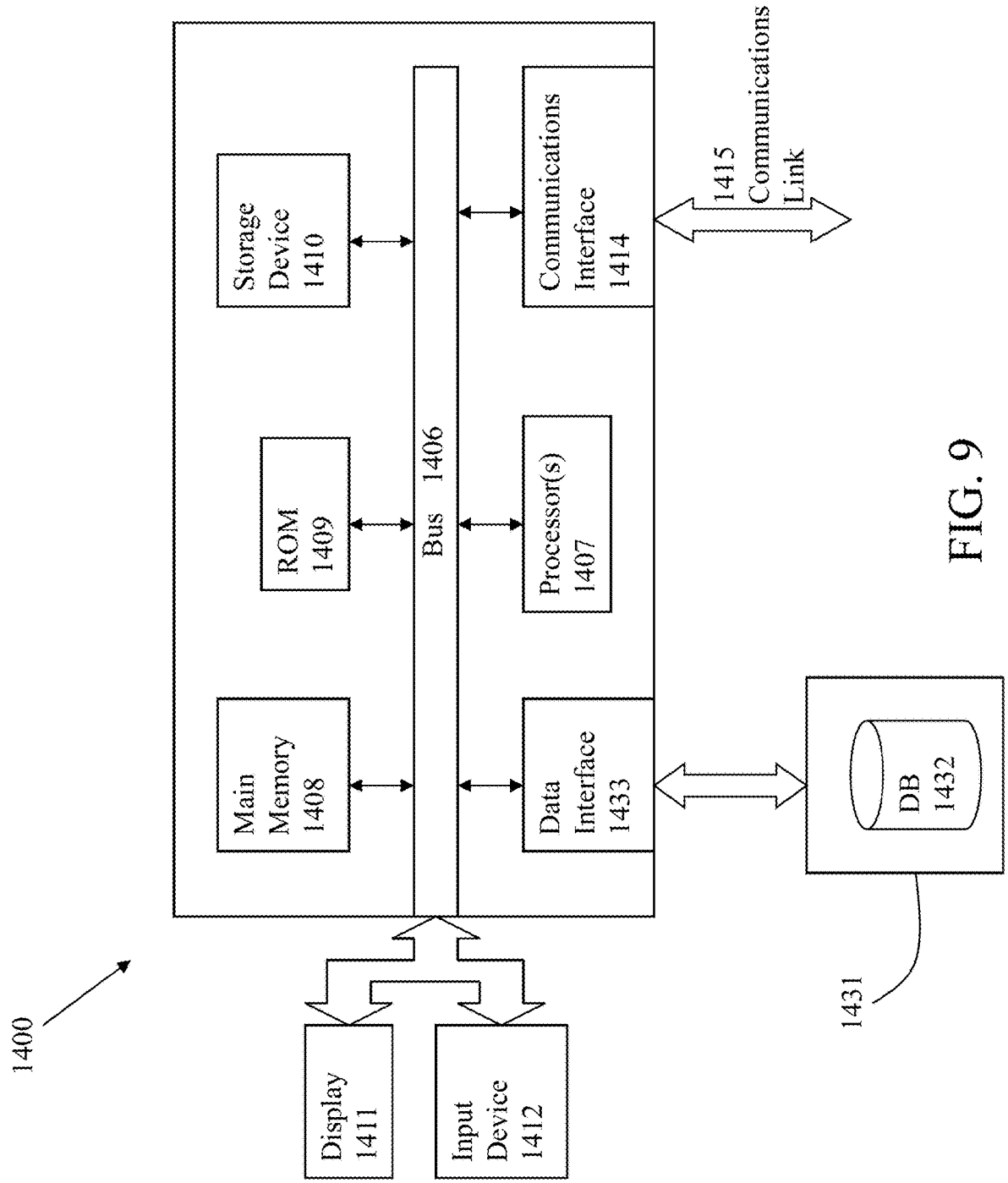
FIG. 9 illustrates a block diagram of an illustrative computing system suitable for implementing an embodiment of the present disclosure.

FIG. 9 is a block diagram of an illustrative computing system 1400 suitable for implementing an embodiment of the present disclosure. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), data interface 1433, and cursor control.

According to some embodiments of the disclosure, computer system 1400 performs specific operations by processor 1407 executing one or more sequences of one or more instructions contained in system memory 1408. Such instructions may be read into system memory 1408 from another non-transitory computer readable/usable medium, such as static storage device 1409 or disk drive 1410. In alternative embodiments, hard-wired circuitry may be used in place of or in combination with software instructions to implement the disclosure. Thus, embodiments of the disclosure are not limited to any specific combination of hardware circuitry and/or software. In some embodiments, the term "logic" shall mean any combination of software or hardware that is used to implement all or part of the disclosure.

The term non-transitory "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of non-transitory computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the disclosure, execution of the sequences of instructions to practice the disclosure is performed by a single computer system 1400. According to other embodiments of the disclosure, two or more computer systems 1400 coupled by communication link 1410 (e.g., LAN, PTSN, or wireless network) may perform the sequence of instructions required to practice the disclosure in coordination with one another.

Computer system 1400 may transmit and receive messages, data, and instructions, including program, e.g., application code, through communication link 1415 and communication interface 1414. Received program code may be executed by processor 1407 as it is received, and/or stored in disk drive 1410, or other non-volatile storage for later execution. A database 1432 in a storage medium 1431 may be used to store data accessible by the system 1400 via data interface 1433.

Figure 10:
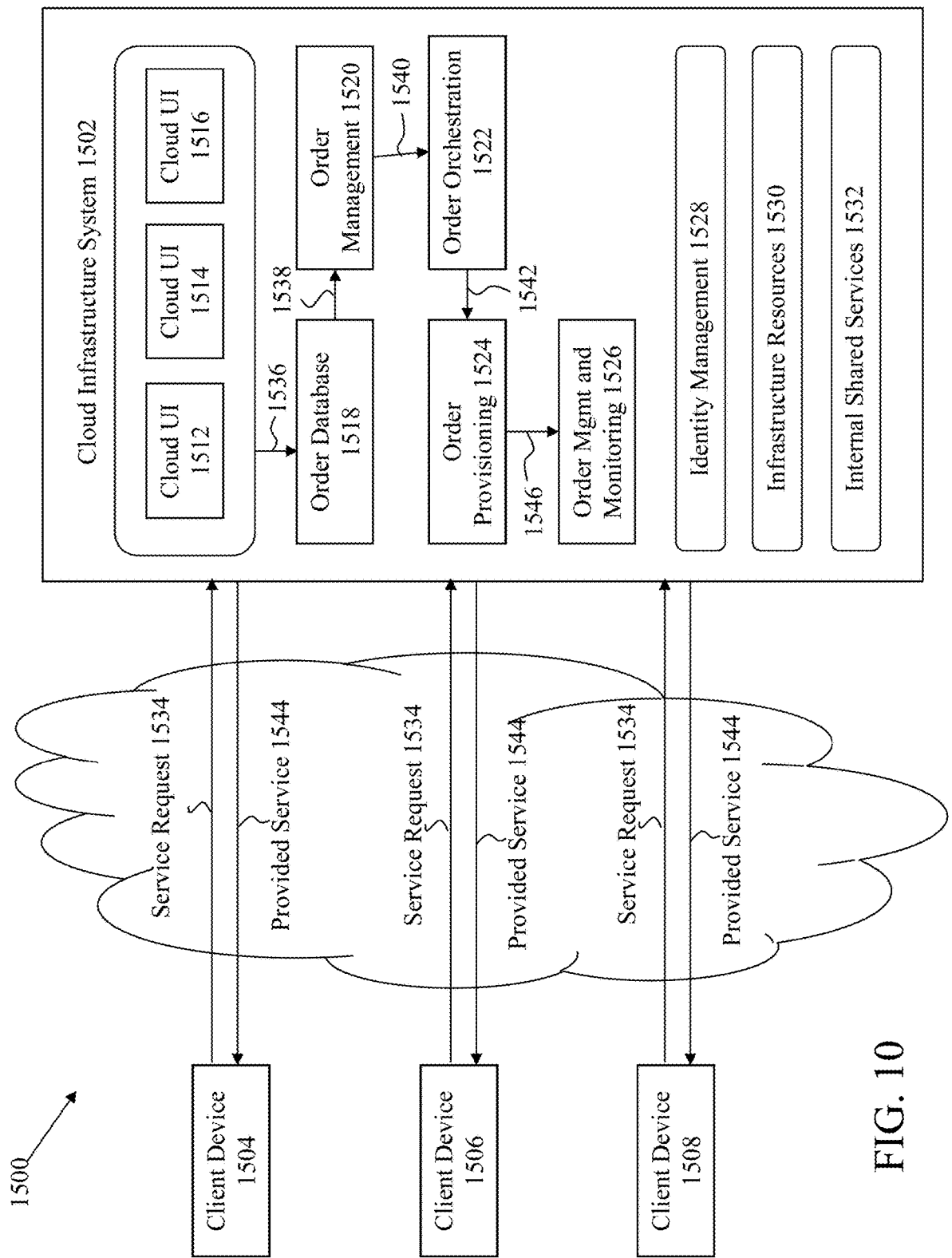
FIG. 10 illustrates a block diagram of one or more components of a system environment by which more efficient access to ordered sequences in a database environment is provided, in accordance with an embodiment of the present disclosure.

FIG. 10 is a simplified block diagram of one or more components of a system environment 1500 by which more efficient access to ordered sequences in a clustered database environment is provided, in accordance with an embodiment of the present disclosure. In the illustrated embodiment, system environment 1500 includes one or more client computing devices 1504, 1506, and 1508 that may be used by users to interact with a cloud infrastructure system 1502 that provides cloud services. The client computing devices may be configured to operate a client application such as a web browser, a proprietary client application, or some other application, which may be used by a user of the client computing device to interact with cloud infrastructure system 1502 to use services provided by cloud infrastructure system 1502.

It should be appreciated that cloud infrastructure system 1502 depicted in the figure may have other components than those depicted. Further, the embodiment shown in the figure is only one example of a cloud infrastructure system that may incorporate an embodiment of the disclosure. In some other embodiments, cloud infrastructure system 1502 may have more or fewer components than shown in the figure, may combine two or more components, or may have a different configuration or arrangement of components. Client computing devices 1504, 1506, and 1508 may be devices similar to those described. Although system environment 1500 is shown with three client computing devices, any number of client computing devices may be supported. Other devices such as devices with sensors, etc. may interact with cloud infrastructure system 1502.

Network(s) 1510 may facilitate communications and exchange of data between client computing devices 1504, 1506, and 1508 and cloud infrastructure system 1502. Each network may be any type of network familiar to those skilled in the art that can support data communications using any of a variety of commercially-available protocols. Cloud infrastructure system 1502 may comprise one or more computers and/or servers.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1502 may include a suite of applications, middleware, and database service offerings that are delivered to a customer in a self-service, subscription-based, elastically scalable, reliable, highly available, and secure manner.

In various embodiments, cloud infrastructure system 1502 may be adapted to automatically provision, manage and track a customer's subscription to services offered by cloud infrastructure system 1502. Cloud infrastructure system 1502 may provide the cloud services via different deployment models. For example, services may be provided under a public cloud model in which cloud infrastructure system 1502 is owned by an organization selling cloud services and the services are made available to the general public or different industry enterprises. As another example, services may be provided under a private cloud model in which cloud infrastructure system 1502 is operated solely for a single organization and may provide services for one or more entities within the organization. The cloud services may also be provided under a community cloud model in which cloud infrastructure system 1502 and the services provided by cloud infrastructure system 1502 are shared by several organizations in a related community.

The cloud services may also be provided under a hybrid cloud model, which is a combination of two or more different models.

In some embodiments, the services provided by cloud infrastructure system 1502 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1502. Cloud infrastructure system 1502 then performs processing to provide the services in the customer's subscription order.

In some embodiments, the services provided by cloud infrastructure system 1502 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that allow organizations to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services, and Java cloud services. In one embodiment, database cloud services may support shared service deployment models that allow organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1502 may also include infrastructure resources 1530 for providing the resources used to provide various services to customers of the cloud infrastructure system. In one embodiment, infrastructure resources 1530 may include pre-integrated and optimized combinations of hardware, such as servers, storage, and networking resources to execute the services provided by the PaaS platform and the SaaS platform.

In some embodiments, resources in cloud infrastructure system 1502 may be shared by multiple users and dynamically re-allocated per demand. Additionally, resources may be allocated to users in different time zones. For example, cloud infrastructure system 1530 may allow a first set of users in a first time zone to utilize resources of the cloud infrastructure system for a specified number of hours and then allow the re-allocation of the same resources to another set of users located in a different time zone, thereby maximizing the utilization of resources.

In certain embodiments, a number of internal shared services 1532 may be provided that are shared by different components or modules of cloud infrastructure system 1502 and by the services provided by cloud infrastructure system 1502. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1502 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1502, and the like.

In one embodiment, as depicted in the figure, cloud management functionality may be provided by one or more modules, such as an order management module 1520, an order orchestration module 1522, an order provisioning module 1524, an order management and monitoring module 1526, and an identity management module 1528. These modules may include or be provided using one or more computers and/or servers, which may be general purpose computers, specialized server computers, server farms, server clusters, or any other appropriate arrangement and/or combination.

In operation 1534, a customer using a client device, such as client computing devices 1504, 1506 or 1508, may interact with cloud infrastructure system 1502 by requesting one or more services provided by cloud infrastructure system 1502 and placing an order for a subscription for one or more services offered by cloud infrastructure system 1502. In certain embodiments, the customer may access a cloud User Interface (UI), cloud UI 1512, cloud UI 1514 and/or cloud UI 1516 and place a subscription order via these UIs. The order information received by cloud infrastructure system 1502 in response to the customer placing an order may include information identifying the customer and one or more services offered by the cloud infrastructure system 1502 that the customer intends to subscribe to.

After an order has been placed by the customer, the order information is received via the cloud UIs, 1512, 1514 and/or 1516. At operation 1536, the order is stored in order database 1518. Order database 1518 can be one of several databases operated by cloud infrastructure system 1502 and operated in conjunction with other system elements. At operation 1538, the order information is forwarded to an order management module 1520. In some instances, order management module 1520 may be configured to perform billing and accounting functions related to the order, such as verifying the order, and upon verification, booking the order. At operation 1540, information regarding the order is communicated to an order orchestration module 1522. Order orchestration module 1522 may utilize the order information to orchestrate the provisioning of services and resources for the order placed by the customer. In some instances, order orchestration module 1522 may orchestrate the provisioning of resources to support the subscribed services using the services of order provisioning module 1524.

In certain embodiments, order orchestration module 1522 allows the management of business processes associated with each order and applies business logic to determine whether an order should proceed to provisioning. At operation 1542, upon receiving an order for a new subscription, order orchestration module 1522 sends a request to order provisioning module 1524 to allocate resources and configure those resources needed to fulfill the subscription order. Order provisioning module 1524 allows the allocation of resources for the services ordered by the customer. Order provisioning module 1524 provides a level of abstraction between the cloud services provided by cloud infrastructure system 1502 and the physical implementation layer that is used to provision the resources for providing the requested services. Order orchestration module 1522 may thus be isolated from implementation details, such as whether or not services and resources are actually provisioned on the fly or pre-provisioned and only allocated/assigned upon request.

At operation 1544, once the services and resources are provisioned, a notification of the provided service may be sent to customers on client computing devices 1504, 1506 and/or 1508 by order provisioning module 1524 of cloud infrastructure system 1502.

At operation 1546, the customer's subscription order may be managed and tracked by an order management and monitoring module 1526. In some instances, order management and monitoring module 1526 may be configured to collect usage statistics for the services in the subscription order, such as the amount of storage used, the amount data transferred, the number of users, and the amount of system up time and system down time.

In certain embodiments, cloud infrastructure system 1502 may include an identity management module 1528. Identity management module 1528 may be configured to provide identity services, such as access management and authorization services in cloud infrastructure system 1502. In some embodiments, identity management module 1528 may control information about customers who wish to utilize the services provided by cloud infrastructure system 1502. Such information can include information that authenticates the identities of such customers and information that describes which actions those customers are authorized to perform relative to various system resources (e.g., files, directories, applications, communication ports, memory segments, etc.) Identity management module 1528 may also include the management of descriptive information about each customer and about how and by whom that descriptive information can be accessed and modified.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative rather than restrictive sense. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments.

What is claimed is:

1. A method, comprising:
   maintaining a respective space usage cache at each of a plurality of database instances in a cluster, wherein the respective space usage cache comprises a respective local alloc data and a respective local dealloc data;
   initiating a synchronization operation at a database instance for the space usage cache;
   retrieving the respective local alloc data and the respective local dealloc data to the database instance from at least some of the plurality of database instances in the cluster;
   determining a difference between a stored space usage data and a total of alloc data or dealloc data; and
   updating the stored space usage data if the difference is identified.

2. The method of claim 1, wherein space usage cache further comprises at least one of a global alloc seen data or a global dealloc seen data.

3. The method of claim 1, wherein the total of the alloc data or the dealloc data is greater than the stored space usage data, and the stored space usage data is increased to account for the difference.

4. The method of claim 1, wherein the total of the alloc data or the dealloc data is less than the stored space usage data, and a reconfiguration is identified based upon the difference.

5. The method of claim 4, wherein the respective space usage cache is primed to address the reconfiguration.

6. The method of claim 1, wherein the total of the alloc data or the dealloc data is equal to the stored space usage data, and no change is made to the stored space usage data.

7. The method of claim 1, wherein a drift occurs between the respective space usage cache and disk-based usage data, wherein the respective local alloc data or the respective local dealloc data is adjusted to compensate for the drift.

8. A system comprising:
   a processor; and
   a memory to hold a set of program code instructions, in which the set of program code instructions comprises program code to perform maintaining a respective space usage cache at each of a plurality of database instances in a cluster, wherein the respective space usage cache comprises a respective local alloc data and a respective local dealloc data; initiating a synchronization operation at a database instance for the space usage cache; retrieving the respective local alloc data and the respective local dealloc data to the database instance from at least some of the plurality of database instances in the cluster; determining a difference between a stored space usage data and a total of alloc data or dealloc data; and updating the stored space usage data if the difference is identified.

9. The system of claim 8, wherein space usage cache further comprises at least one of a global alloc seen data or a global dealloc seen data.

10. The system of claim 8, wherein the total of the alloc data or the dealloc data is greater than the stored space usage data, and the stored space usage data is increased to account for the difference.

11. The system of claim 8, wherein the total of the alloc data or the dealloc data is less than the stored space usage data, and a reconfiguration is identified based upon the difference.

12. The system of claim 11, wherein the respective space usage cache is primed to address the reconfiguration.

13. The system of claim 8, wherein the total of the alloc data or the dealloc data is equal to the stored space usage data, and no change is made to the stored space usage data.

14. The system of claim 8, wherein a drift occurs between the respective space usage cache and disk-based usage data, wherein the respective local alloc data or the respective local dealloc data is adjusted to compensate for the drift.

15. A tangible computer program product including a non-transitory computer readable medium having stored thereupon instructions which, when executed by a processor, causes the processor to perform a set of acts, the set of acts comprising:

maintaining a respective space usage cache at each of a plurality of database instances in a cluster, wherein the respective space usage cache comprises a respective local alloc data and a respective local dealloc data;
initiating a synchronization operation at a database instance for the space usage cache;
retrieving the respective local alloc data and the respective local dealloc data to the database instance from at least some of the plurality of database instances in the cluster;
determining a difference between a stored space usage data and a total of alloc data or dealloc data; and
updating the stored space usage data if the difference is identified.

16. The computer program product of claim 15, wherein space usage cache further comprises at least one of a global alloc seen data or a global dealloc seen data.

17. The computer program product of claim 15, wherein the total of the alloc data or the dealloc data is greater than the stored space usage data, and the stored space usage data is increased to account for the difference.

18. The computer program product of claim 15, wherein the total of the alloc data or the dealloc data is less than the stored space usage data, and a reconfiguration is identified based upon the difference.

19. The computer program product of claim 18, wherein the respective space usage cache is primed to address the reconfiguration.

20. The computer program product of claim 15, wherein the total of the alloc data or the dealloc data is equal to the stored space usage data, and no change is made to the stored space usage data.

21. The computer program product of claim 15, wherein a drift occurs between the respective space usage cache and disk-based usage data, wherein the respective local alloc data or the respective local dealloc data is adjusted to compensate for the drift.

* * * * *

UNITED STATES PATENT AND TRADEMARK OFFICE
CERTIFICATE OF CORRECTION

| | |
|---|---|
| PATENT NO. | : 12,164,543 B2 |
| APPLICATION NO. | : 17/966379 |
| DATED | : December 10, 2024 |
| INVENTOR(S) | : Wu et al. |

Page 1 of 1

It is certified that error appears in the above-identified patent and that said Letters Patent is hereby corrected as shown below:

In the Drawings

On sheet 6 of 21, in FIG. 5B, Line 5, delete "Instae" and insert -- Instance --, therefor.

On sheet 7 of 21, in FIG. 5C, and on the title page, the illustrative print figure, Line 9, delete "Uised" and insert -- Used --, therefor.

In the Specification

In Column 8, Line 17, delete "structureso;" and insert -- structures(); --, therefor.

In Column 11, Line 34, delete "PTSN," and insert -- PSTN, --, therefor.

Signed and Sealed this
Second Day of September, 2025

Coke Morgan Stewart
*Acting Director of the United States Patent and Trademark Office*